United States Patent [19]

Pascalide

[11] Patent Number: 4,682,078
[45] Date of Patent: Jul. 21, 1987

[54] WIRELESS EMERGENCY LIGHTING UNIT

[75] Inventor: Chiriac Pascalide, North Hollywood, Calif.

[73] Assignee: Radiant Illumination, Inc., North Hollywood, Calif.

[21] Appl. No.: 695,277

[22] Filed: Jan. 28, 1985

[51] Int. Cl.[4] .................. H05B 37/00; H05B 41/14
[52] U.S. Cl. .................................... 315/86; 307/64; 307/66; 362/20; 362/183
[58] Field of Search .............. 315/86, 87; 307/64, 307/66; 362/20, 183

[56] References Cited

U.S. PATENT DOCUMENTS

| 3,688,123 | 8/1972 | Walker | 315/86 |
|---|---|---|---|
| 3,833,817 | 9/1974 | Patel | 315/86 |
| 4,117,373 | 9/1978 | Alley | 315/86 |
| 4,144,462 | 3/1979 | Sieron et al. | 315/86 |
| 4,177,500 | 12/1979 | Nicholl et al. | 315/86 |
| 4,297,614 | 10/1981 | Chandler | 315/86 |
| 4,323,820 | 4/1982 | Teich | 315/86 |
| 4,454,452 | 6/1984 | Feldstein | 315/86 |

Primary Examiner—Saxfield Chatmon
Attorney, Agent, or Firm—Roger A. Marrs

[57] ABSTRACT

A circuit is disclosed herein for use in series with a fluorescent lamp and a conventional ballast for supplying operating current to the lamp when the main line source of power has been interrupted. The circuit includes a sensor for detecting the lamp current and utilizes the lamp current for charging a storage battery via a battery charger. An inverter ballast circuit is normally maintained in an "OFF" condition by the sensor and is responsive to the sensor when the power source to the lamp has been interrupted so that the power from the battery is applied to the inverter ballast to turn it to the "ON" condition. Conduction of the inverter ballast circuit provides AC voltage to energize the fluorescent lamp through the conventional ballast.

1 Claim, 5 Drawing Figures

WIRELESS EMERGENCY LIGHTING UNIT

BACKGROUND OF THE INVENTION

1. Field of the Invention

The present invention relates to emergency lighting systems and, more particularly, to a novel wireless means for energizing a fluorescent lamp when primary line power has been interrupted by sensing lamp current to charge a storage battery and to connect the battery to the lamp and its conventional ballast via an inverter ballast circuit in response to the power source interruption.

2. Brief Description of the Prior Art

In the past, it has been the conventional practice to provide an emergency energization of a fluorescent lamp by coupling an emergency power source or supply into the lamp circuit. Coupling necessitates the provision and interconnection of external wires from the emergency power unit to the fluorescent lamp and conventional ballast so that the lamp is energized in response to power interruption from the main power source. In addition to the provision and connection of external wires, the emergency power source generally takes the form of a storage battery which is rechargeable and requires a separate charging source connected to line voltage for charging purposes when the line voltage is present.

Another problem resides with the employment of conventional emergency power sources for fluorescent lamps which stems from the fact that the emergency power unit generally cannot be accommodated into a standard fixture inasmuch as the length of a fluorescent tube is fixed and, therefore, the socket connections at the opposite ends of the tube are also fixed. This sometimes necessitates the provision of mounting the emergency source in the central channel of the shell or reflector portion between adjacent lamps.

Therefore, a long standing need has existed to provide an emergency power source for fluorescent lamps that may be placed in series therewith and be responsive to main power line or source interruption to automatically provide a rechargeable battery power to the conventional ballast and the lamp. Also, a charging circuit is desirable which will recharge the storage battery in the emergency unit directly from lamp current when the lamp is energized during normal operations without interruption of the main power source.

SUMMARY OF THE INVENTION

Accordingly, the above problems and difficulties are obviated by the present invention which provides a novel wireless emergency power source for a fluorescent lamp assembly connected in series with a conventional ballast and incorporating a sensing means for detecting interruption of line current to the lamp and conventional ballast and further includes a storage battery selectively connectable to the lamp and conventional ballast in response to line power interruption so that emergency power is supplied from the storage battery for energizing the lamp and ballast via an inverter ballast means coupled between the battery and the conventional ballast. A charging network or circuit for the storage battery is operably coupled between the sensing means and the inverter ballast means for charging the battery directly from lamp current during non-interruption of line power.

Therefore, it is among the primary objects of the present invention to provide a novel emergency power source for a conventional ballast and fluorescent lamp which does not require wiring between the emergency power unit and the fluorescent lamp or conventional ballast.

Another object of the present invention is to provide a novel emergency power source for a fluorescent lamp which includes an emergency battery which is chargeable by lamp current during the normal non-interruption of line power to the lamp and conventional ballast and which further includes a sensing means for sensing and rectifying lamp current to charge the storage battery.

Yet another object of the present invention is to provide a novel means interconnected between and in series with a fluorescent lamp and a conventional ballast wherein the means is externally wireless and employs lamp current to charge the battery during normal operation of the lamp and which further includes means for selectively supplying battery power via an inverter ballast during line power interruption.

Still a further object of the present invention is to provide a novel sensing and switching circuit in an emergency power source for a fluorescent lamp which includes a relay having switch contacts operable to switch from a battery charging mode of operation to a discharge mode of operation to supply emergency power to the lamp and conventional ballast during power line interruption.

Another object of the present invention is to provide an emergency power source for a fluorescent lamp which senses lamp current for detection of power line interruption rather than sensing the AC power line directly and which employs lamp current to charge an emergency storage battery during normal operation of the fluorescent lamp.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 4 is a circuit diagram of the emergency power unit depicting in the block diagram of FIG. 3.

DESCRIPTION OF THE PREFERRED EMBODIMENT

Figure 1:
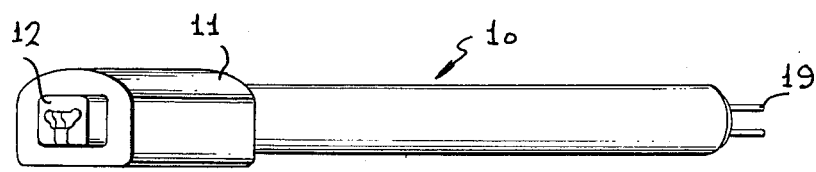
FIG. 1 is a perspective view of the novel emergency power unit incorporating the present invention.

Referring to FIG. 1, the novel emergency power source unit of the present invention is illustrated in the general direction of arrow 10 which includes an elongated housing 11 having connector prongs 19 outwardly extending from one end and having a socket 12 exposed at the opposite end thereof. The socket 12 includes receptacles and contacts adapted to insertably receive the prongs from a fluorescent lamp such as the lamp 13 illustrated in FIG. 2.

Figure 2:
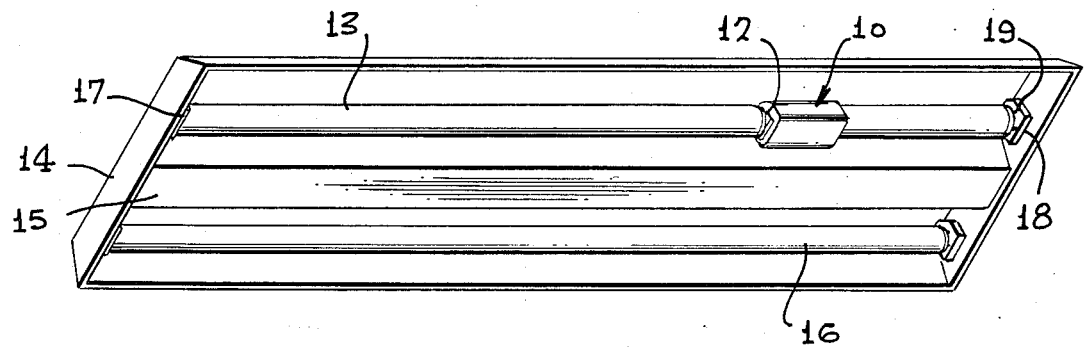
FIG. 2 is a perspective view of a fluorescent light assembly having the emergency power unit shown in FIG. 1 installed in a wireless manner.

Referring now in detail to FIG. 2, a fluorescent light assembly is illustrated having an elongated reflector or housing 14 having a pair of recesses separated by an elongated section 15 wherein each of the recesses mounts a lamp such as lamp 13 and lamp 16 respectively. It is to be particularly noted that lamp 16 is of a conventional size normally in four foot lengths while the lamp 13 is shortened to a three foot length. A feature of the invention resides in the provision of placing the emergency power unit 10 in series with the lamp 13 so that the overall length will be readily accommodated into the socket fixtures 17 and 18 normally provided on the end pieces of the housing 14. In this manner, the emergency power source or unit is available for igniting and maintaining illumination from lamp 13 in the event there is as an interruption in the primary or line power for the lamp. By placing the emergency power source unit 10 in series with lamp 13, it is necessary that the socket 12 be carried on one end of the unit while prongs 19 are carried on the opposite end. The socket 12 receives the prongs from one end of the lamp 13 while the prongs 19 are insertably received into the receptacle of socket 18. By the employment of the socket and prong arrangement and the placement of the unit in series with the lamp, wires normally required for interconnecting the unit to the lamp are not required. Therefore, installation, replacement or repair of either the lamp or unit may be readily accommodated.

Figure 3:
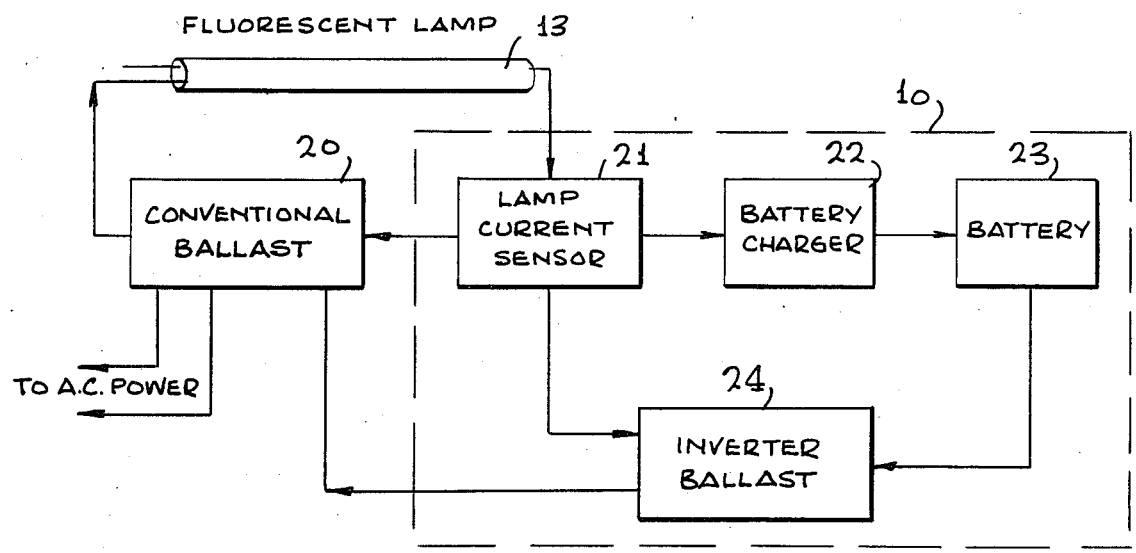
FIG. 3 is a block diagram illustrating the major components incorporated into the emergency power unit shown in FIGS. 1 and 2.
Figure 2:
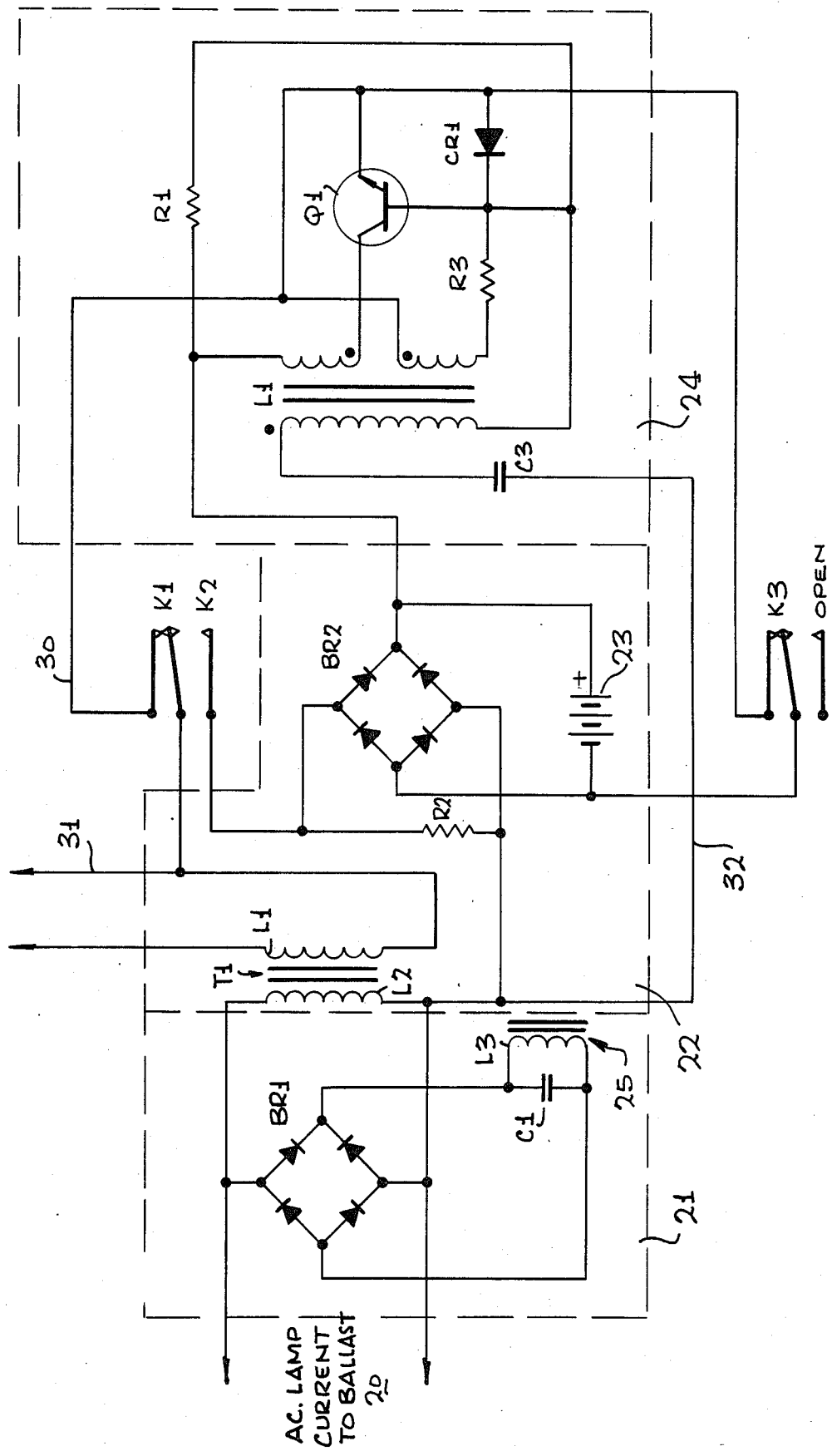

Referring now in detail to FIG. 3, a block diagram is illustrated showing the fluorescent lamp 13 and its conventional ballast 20 which are normally connected to an AC power line in order to energize and operate the fluorescent lamp in the usual manner. However, in the present instance, the emergency power supply unit 10 is coupled in series between the lamp 13 and conventional ballast 20 in a wireless manner as previously described. The emergency power supply unit 10 includes a lamp current sensor 21 connected to a battery charger 22 for selectively charging the storage battery 23. Lamp current of the lamp 13 is detected by the sensor 21 and is employed for charging the battery 23 via the battery charger 22. The sensor 21 also conditons an inverter/ballast 24 into an "OFF" condition or mode during the normal operation of the lamp and the battery charging procedure. The unit 10 senses the lamp current and the sensor 21 maintains the inverter/ballast 24 in an "OFF" condition and allows the lamp current to charge the battery 23. The battery charger 22 charges the battery which, in turn, is connected to the inverter/ballast 24. When energy to lamp 13 or its circuit is interrupted, the sensor 21 allows the inverter/ballast to conduct. The inverter/ballast provides an AC voltage of proper voltage and current to light the fluorescent lamp 13 through connections to the conventional ballast. Therefore, it can be seen that the emergency power unit 10 includes two modes of operation. The first mode is under normal fluorescent lamp and conventional ballast operation wherein lamp current is employed to operate the battery charger for charging the storage battery 23 and the lamp current sensor 21 is employed for disabling the inverter/ballast 24 from operation. The second mode of operation occurs when the conventional power to the lamp 13 and ballast 20 has been interrupted. Such interruption is sensed by the circuit 21 and results in disabling the battery charger 22 while enabling the inverter/ballast 24 to convert the DC battery voltage to an AC voltage for operating the lamp 13.

Referring now in detail to FIG. 4, the circuit for the emergency power unit 10 is illustrated wherein it can be seen that the sensor 21 detects and senses the lamp current supplied by the conventional ballast to operate the fluorescent lamp 13 and operates through a relay 25 to allow, in the first mode, charging of the battery 23 via the charging circuit 22 and to permit discharging of the battery in the second mode through the inverter/ballast 24. The lamp current sensor 21 does not utilize the lamp current directly to charge the battery 23 but transforms the lamp current through a transformer T1 which, through its inductance, senses lamp current but not filament current for the fluorescent lamp. The lamp current is then rectified via bridge BR2 and applied to the battery 23 only when the lamp 13 and ballast 20 are normally in operation. This is achieved through the closed contacts K2 of the relay 25.

Initially, in the first mode of normal operation, alternating lamp current is introduced to primary coil L1 of the transformer T1 and via secondary coil L2 to the ballast 20 and to the bridge circuit BR1. Thereupon, current is provided to a network comprising capacitor C1 and coil L3 of relay 25 which, in turn, opens the normally closed contacts K1 and K3 and closes the normally open contact K2. Thus, the battery circuit is maintained charging since K2 is closed and the inverter/ballast 23 is maintained in its "OFF" mode since K3 is open. Again, it is repeated that the lamp current supplied to the relay is used and not transformer current in order to charge the battery. The relay operates as a switch through its contacts so as to change from the charging mode to a battery discharge mode.

During the emergency or second mode of operation, line voltage and current to the lamp and conventional ballast is interrupted and current to the relay coil L2 is lost so that contact K1 and contact K3 close while K2 opens the transistor circuit including the transistor Q1 in the inverter/ballast network or circuit 23 serves to convert the DC voltage of the battery to an AC voltage of proper voltage and current in order to light the florescent lamp 13 through the lead connections 30, 31 and to the conventional ballast 20. The closing of grounding contact K3 completes the power circuit to the inverter 24 which serves as a converter to AC supply of proper voltage and current along line 32 to the ballast 20.

The lamp current could be directly used to charge the battery without passing through a transformer if desired.

Figure 5:
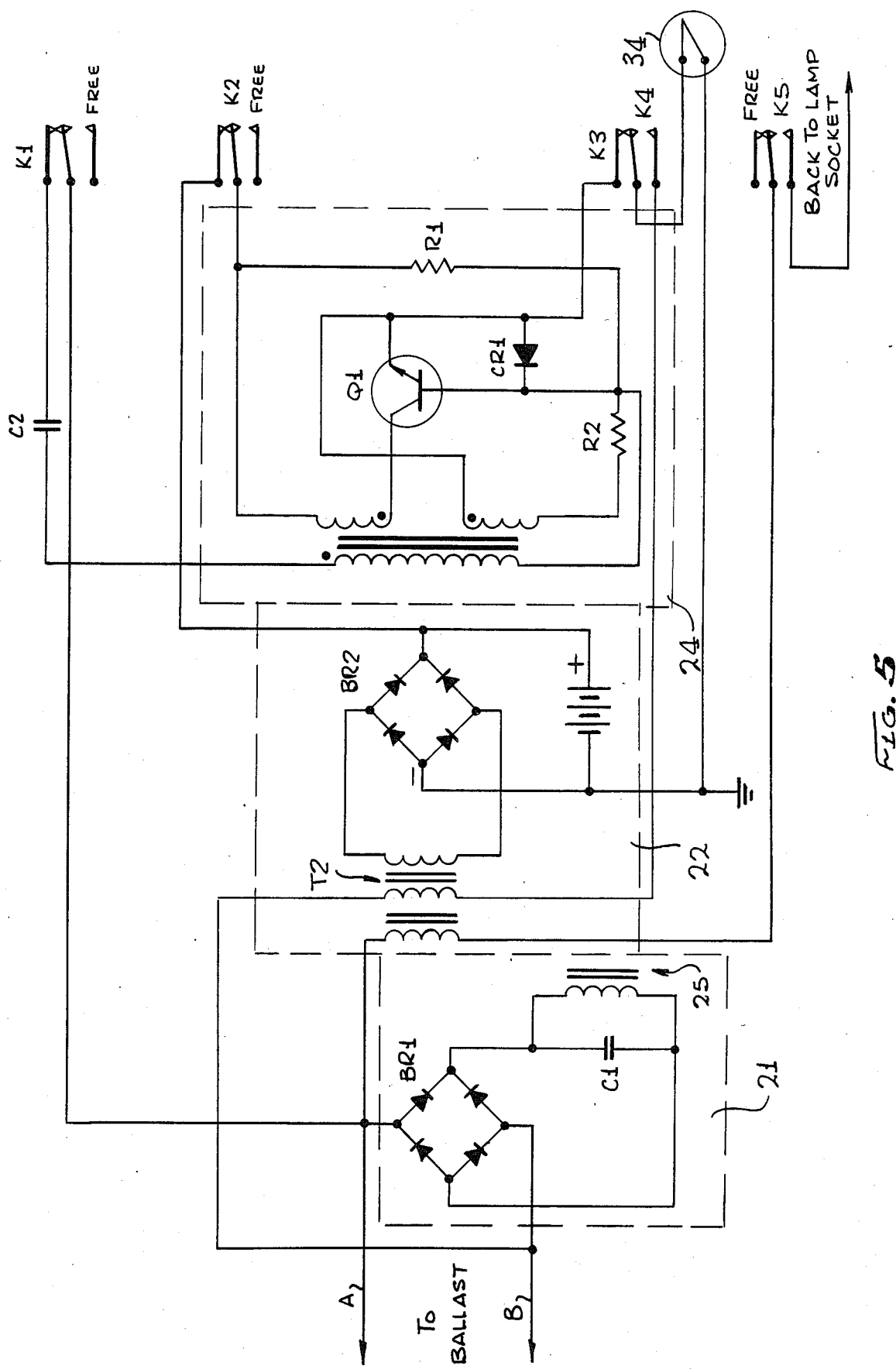
FIG. 5 is a circuit diagram of another version of the present invention.

Another version of the inventive circuit is shown in FIG. 5 which includes a sensing relay switching circuit 21, a battery charging circuit 22 and an inverter circuit 24 as indicated in FIG. 3. The circuit of unit 10 is substantially similar to the circuit of FIG. 4 with the exception that a three coil transformer T2 is employed and a safety interlock or interrupting contact 34 is included.

During the first or normal operational mode, energized relay 25 from lamp current will operate charger 22 when contacts K4, K5 are closed via the transformer and the others are open. However, when power interruption occurs, contacts K2 and K3 return to their normally closed condition which energizes the inverter by the discharging battery and closed contact K1 applies the AC output from the inverter to the ballast 20.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An externally wireless emergency power unit for use with a standard fluorescent lamp of the type mountable in a conventional fixture incorporating conventional ballast means and operable when powered by an AC line through said conventional ballast means, said lamp being illuminated when power from said AC line is operatively connected to first and second terminals on said fixture, said emergency power unit being operable to illuminate said lamp when the AC line voltage falls below a predetermined level, said unit comprising:

a unitized elongated housing and circuit means wholly enclosed within said housing;

said housing comprising connectors carried on its opposite ends, one of said connectors being adapted to be inserted in one socket of said conventinal fixture and the other of said connectors being adapted to engage with a connector at one end of said standard fluorescent lamp, the connector at the other end of which is adapted to engage another socket of said fixture;

said circuit means comprising a pair of leads adapted to be connected through said one connector from said ballast means to apply a voltage derived from said AC line to a first winding of a heater voltage transformer within said emergency unit, a second winding of said transformer being connected through said other connector to said one end of said lamp;

a rechargable storage battery;

a battery charging circuit for charging said battery;

an inverter circuit including a transistor having a collector-emitter circuit energizable from said battery;

sensor means for sensing said voltage across said pair of leads to determine when said voltage falls below a predetermined level; and switch means, including a switch contact connecting the emitter of said collector-emitter circuit and one side of said battery, responsive to said sensor when said voltage is at or above said level, for connecting said battery charging circuit to derive charging current from current flowing through said lamp and disabling said inverter circuit by opening said switch contact and, when said voltage falls below said level, for disabling said charging circuit and connecting said battery across the collector-emitter circuit of said inverter circuit by closing said switch contact and connecting the output voltage from said inverter circuit betwen said other connector connected to said one end of said fluorescent lamp and, through one of said leads, said one connector and said ballast means, to the other end of said lamp, whereby said lamp is illuminated from said battery when said voltage falls below said level, said sensor means comprising a rectifier bridge having its input terminals connected across said pair of leads and having its output terminals connected across a single relay coil, said single relay coil controlling said switch means.

* * * * *